United States Patent [19]

Ross et al.

[11] 4,101,144
[45] Jul. 18, 1978

[54] TRAILER FOR HANDLING CONTAINER-CARRYING PALLET FRAMES

[76] Inventors: Douglas Ross, 3043 122nd Pl. NE., Bellevue, Wash. 98005; Keith Blackburn, 1316 Florence St., Enumclaw, Wash. 98022

[21] Appl. No.: 827,616

[22] Filed: Oct. 11, 1977

Related U.S. Application Data

[62] Division of Ser. No. 765,341, Jan. 21, 1977, Pat. No. 4,053,072.

[51] Int. Cl.² ............................................. B62D 21/02
[52] U.S. Cl. ............................ 280/423 B; 280/43.23; 280/767
[58] Field of Search ............... 280/43.12, 43.14, 43.17, 280/43.22, 761, 767, 423 B, 423 R, 80 R, 81 R, 43.23; 214/505, 512, 515, 506

[56] References Cited

U.S. PATENT DOCUMENTS

| 3,737,061 | 6/1973 | Glumac | 214/515 X |
| 4,006,913 | 2/1977 | Rimhagen | 280/43.12 X |

Primary Examiner—Joseph F. Peters, Jr.
Assistant Examiner—R. Schrecengost
Attorney, Agent, or Firm—Seed, Berry, Vernon & Baynham

[57] ABSTRACT

A trailer having a rear central guide post and primary rear load carrying wheels which can be elevated to transfer ground contact to caster wheels and lower the trailer bed so that the trailer can be readily maneuvered while the trailer is backed on the caster wheels to assist in properly aligning the trailer beneath a leg-mounted pallet frame for containers having a center guide slot for receiving the guide post, whereupon the primary wheels are lowered to lift the pallet frame free of the ground for transport on the trailer.

13 Claims, 13 Drawing Figures

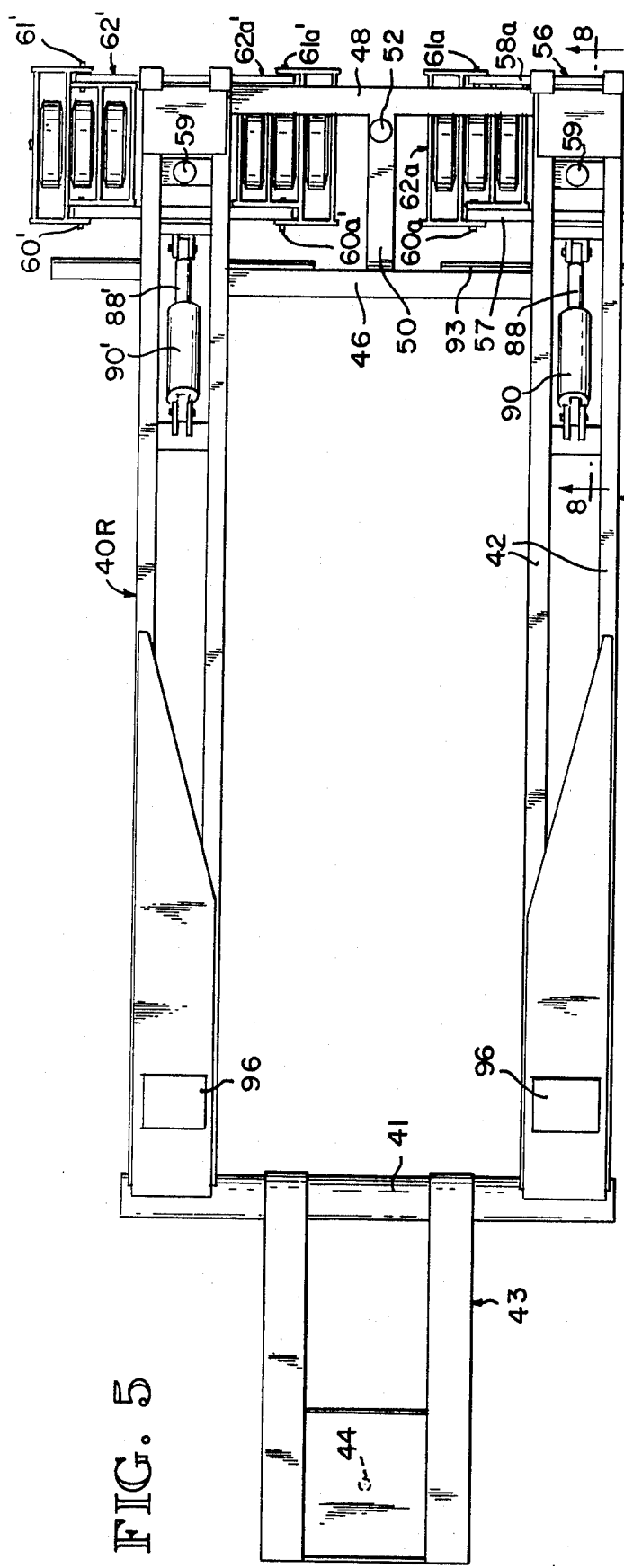
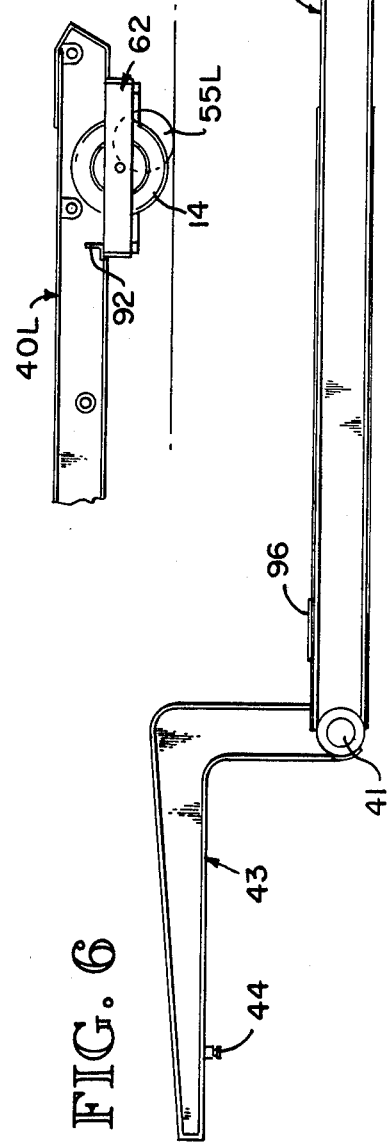
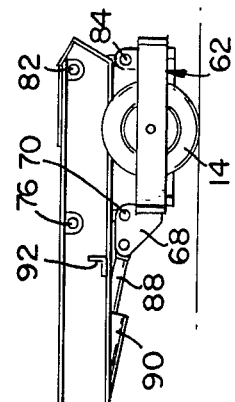
FIG. 5
FIG. 6
FIG. 7

TRAILER FOR HANDLING CONTAINER-CARRYING PALLET FRAMES

CROSS REFERENCE TO RELATED APPLICATION

This application is a division of our pending application Ser. No. 765,341, filed Jan. 21, 1977, entitled "Container Transport System and Apparatus," and now U.S. Pat. No. 4,053,072.

BACKGROUND OF THE INVENTION

1. Field of the Invention

The present invention relates to container transport systems of the type in which containers are stored on leg-mounted pallet frames and the loaded pallet frames are moved by use of trailers having their beds adapted to be lowered to a level to be backed beneath a selected pallet frame and then raised to lift the legs of the pallet frame out of ground contact. More particularly, the invention provides improvements in the trailer component of such a system.

2. Description of the Prior Art

To elaborate, as discussed in U.S. Pat. No. 3,948,403, it is advantageous in loading and unloading a container ship to handle a group of standardized containers as a single load unit carried in a transportable pallet frame which is adapted to be raised out of ground contact by a complementing trailer after it is driven beneath the pallet frame. In the commercial embodiment of the system disclosed in said patent, known as the "Luf System," and marketed by Salen & Wicander Terminal System AB, Gothenberg, Sweden, the pallet frame is generally H-shaped in plan view with the two legs of the H comprising opposed side channels with which the longitudinal side rails of a special low-chassis semi-trailer interfit as the trailer is backed beneath the load frame by a suitable towing vehicle. The trailer has a relatively large number of vertically adjustable support wheels at the rear arranged in two parallel rows adjustable in height to raise the trailer chassis and thereby raise the pallet frame from ground contact.

In the Luf System there is very little tolerance between the side rails of the trailer and the side channels of the pallet frame with which they must interfit, and hence the driver of the towing vehicle has difficulty in backing the trailer into proper position. As a result the pallet frame transporting operation is made slower than it should be and lateral scuffing of the tractor tires on the road surface is commonly experienced while rearwardly maneuvering the trailer beneath the pallet frames.

SUMMARY OF THE INVENTION

The present invention aims to provide an improved trailer for a container handling system generally of the type above described which is much more maneuverable and easily backed in proper position beneath a pallet frame and has an improved arrangement for changing the level of the rear of the trailer bed.

Another object is to provide an improved such trailer in which the load of a loaded pallet frame carried by the trailer is transmitted to the trailer wheels then in ground contact without any of the load being taken by hydraulic components used to vary the elevation of the trailer bed.

In carrying out the foregoing objects and providing other advantages which will appear during the detailed description of the invention, there is provided a pallet frame with corner legs and open at the sides which has a center guide rail presenting a guide slot exposed to the underside of the pallet frame and at its ends to receive a central guide stud projecting upwardly at the rear of the trailer. The trailer has a pair of caster wheels used while the trailer is being rearwardly maneuvered, first to locate the guide stud in the guide slot of the pallet frame, and then to back the trailer beneath the pallet frame in proper alinement therewith. During this backing operation two laterally spaced sets of primary wheels are raised out of ground contact. Then the primary wheels are lowered hydraulically in a rearward swinging movement to a ground contacting level spaced beneath the caster wheels, thereby elevating the caster wheels and the rear of the trailer to lift the pallet frame on the trailer free of the ground for transport. At the same time the operator raises the forward end of the trailer by a lifting mechanism on the towing vehicle.

BRIEF DESCRIPTION OF THE FIGURES OF THE DRAWINGS

In the accomapnying drawings:

FIG. 5 is a top plan view of the trailer;

FIG. 6 is a side elevational view of the trailer with its primary wheels in lowered supporting position;

FIG. 7 is a fragmentary side elevational view of the trailer illustrating the trailer supported by its caster wheels.

DETAILED DESCRIPTION OF THE INVENTION

Figure 1:
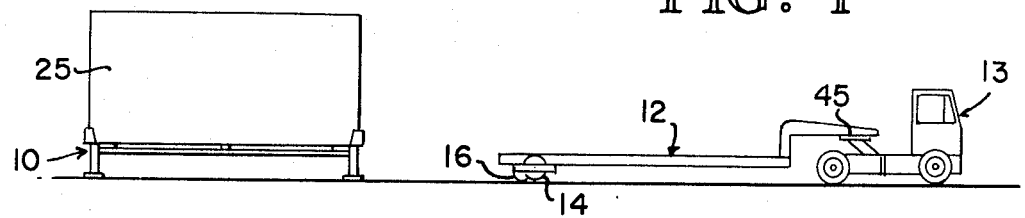
FIG. 1 is a side elevational view showing the trailer supported on its caster wheels and in position to be backed beneath the pallet frame which is carrying containers, in accordance with the present invention.

Referring to the drawings it is seen that the system of the invention comprises a pallet frame 10 and a semi-trailer 12 with optionally used primary wheels 14 for load support and caster wheels 16 for maneuvering beneath the pallet frame by use of a tractor 13.

Figure 3:
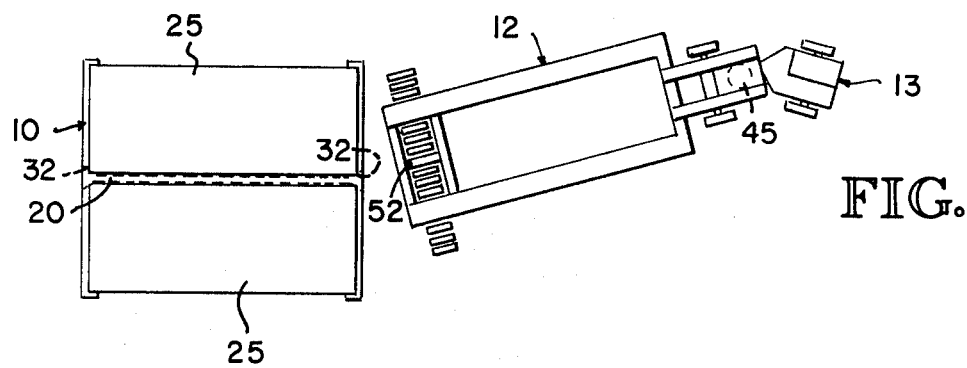
FIG. 3 is a top plan view showing an example of the trailer being backed to the pallet frame.
Figures 10, 11:
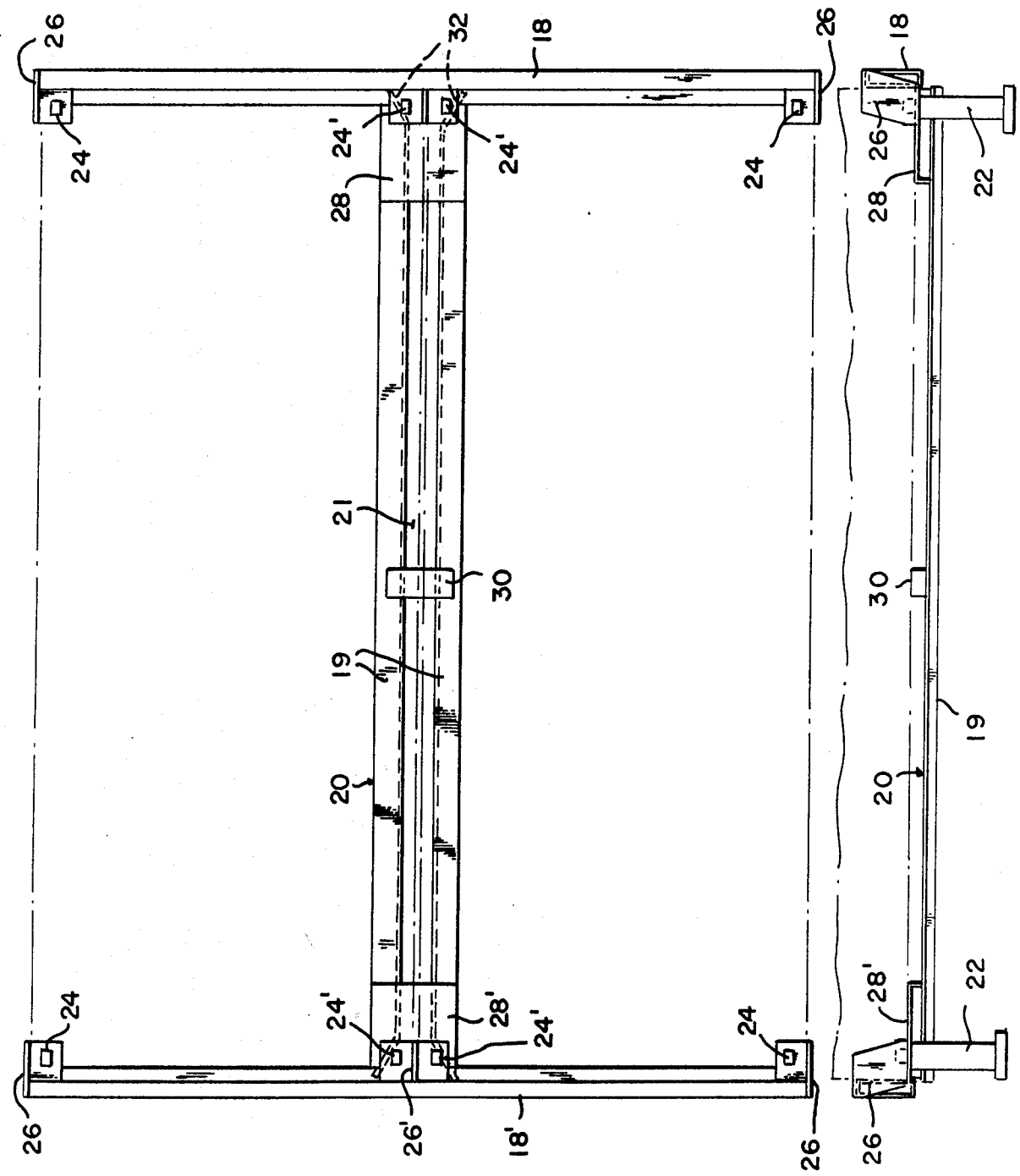
FIG. 10 is a top plan view of the pallet frame.
FIG. 11 is a side elevational view of the pallet frame.
Figure 12:
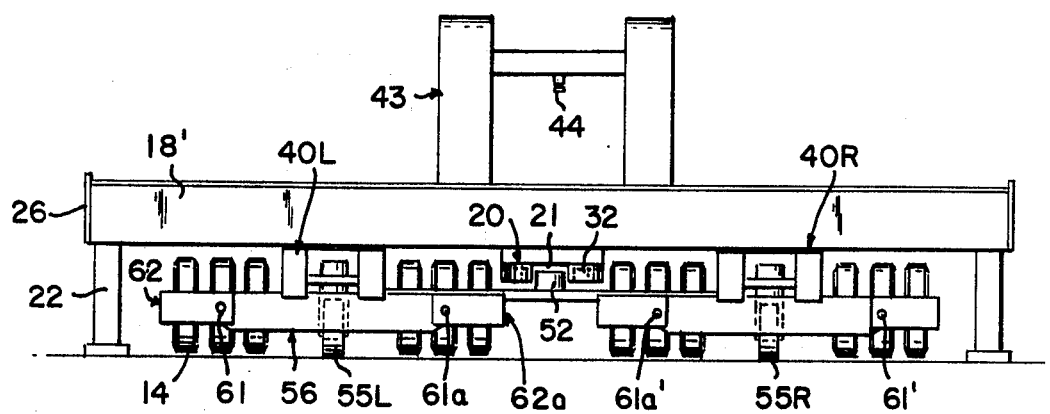
FIG. 12 is a rear elevational view showing the trailer beneath the pallet frame and supported by its caster wheels.

Directing attention to the pallet frame 10 (FIGS. 10-11) it is seen that it is of a general H-shape in plan view with the arms 18, 18' of the H being at the ends and the cross-bar of the H extending longitudinally along the center axis of the lift frame and being formed by two parallel spaced angle irons 19 to serve as a center guide rail 20 presenting a downwardly exposed center guide slot 21 open at the ends of the pallet frame. It will be noted that the pallet frame is symmetrical so that either end thereof can function as the front or rear, and has four corner legs 22 depending from respective of the outer ends of the arms 18, 18'. At the upper end of each leg 22 there is provided a standard coupling stud 24 for interfitting with the standard socket provided at the bottom of the corners of conventional transport containers. These studs 24 are complemented by pairs of like studs 24' adjacent the ends of the center guide rail 20 arranged so that two containers 25 can rest on the lift frame, one on each side, as shown in FIG. 3, and have the sockets at its corners register with two of the outer coupling studs 24 and two of the inner coupling studs 24'. As seen in FIG. 11, the arms 18, 18' extend upwardly above the level of the studs 24, 24' to assist in retaining containers 25 in the longitudinal direction, and corner webs 26 and a pair of central webs 26' extend upwardly to assist in the lateral direction.

The center guide rail 20 has its components 19 cross-connected by end plates 28, 28' and a central plate 30, and arranged so that the guide slot 21 is located below the bottom level of the arms 18, 18'. Entry to the ends of the guide slot 21 is aided by respective pairs of diverging guide plates 32. The arms 18, 18' are rigidly connected to the guide rail 20 by weld connections to the plates 28, 28' and this rigid connection may also include short diagonal cross-braces (not shown), but if such cross-braces are used they should be spaced apart longitudinally of the pallet frame a sufficient distance to permit side entry to the pallet frame by a fork lift truck or other suitable container handling vehicle which can be driven from either side of the lift frame between the arms 18, 18', reach with its forks across the center rail 10, and deposit or remove a container on the other side of the pallet frame. In that manner the pallet frame can be completely loaded or unloaded from the side even when access from one of its sides is blocked.

Continuing to the trailer 12, the frame of the trailer functions in the system as a pallet support frame and has a pair of side rails 40R, 40L each comprising a pair of cross-connected oppositely facing channel members 42 connecting at the forward end to a front cross-tube 41. Projecting upwardly and then forwardly from this cross-tube 41 is a gooseneck 43 presenting a kingpin 44 to couple the trailer with the fifth wheel plate 45 of a tractor 13 equipped with an elevating mechanism for the fifth wheel such, for example, as disclosed in our earlier filed pending application Ser. No. 729,836, filed Oct. 4,1976. The tractor 13 may be an articulated type as disclosed in said application, or non-articulated with steerable front wheels, or of the Euclid earth-mover type, or any other suitable towing vehicle having provision for elevating the front of the trailer. In any regard, for ease of maneuvering it is preferred that the trailer and the towing vehicle collectively comprise an articulated vehicle.

At the rear the trailer frame has two cross-braces 46, 48 extending transversely between the side rails 40R, 40L and centrally interconnected by a center longitudinal frame member 50. An upstanding guide post 52 is mounted near the junction of the frame member 50 and rear cross-brace 48 to register as a fulcrum with the center guide rail 20 of the pallet frame 10. If desired, the guide post 52 may comprise a roller or nest of rollers arranged to serve as a pivot for the frame of the trailer relative to the guide rail 20.

The wheel support for the rear of the trailer 12 comprises right and left sets of primary load supporting wheels 14, each set having six wheels for purposes of example, and right and left caster wheels 55R, 55L. The mounting arrangement for the wheels at each side of the trailer is the same so the arrangement on the left side of the trailer will now be described, and corresponding parts on the right side of the trailer will be given the same numeral identification followed by a prime.

The caster wheel 55L projects downwardly from a mounting 59 between the channels 42 of the side rail 40L through the open rectangular frame of a cradle 51 having front laterally projecting trunnion arms 57, 57a and rear laterally projecting trunnion arms 58, 58a. Pivotally mounted at 60, 61 on the free ends of the outer trunnion arms 57, 58 and at 60a, 61a on the free end of the inner trunnion arms 57a, 58a are outer and inner bogie frames 62,62a, respectively, each having a respective axle 64 for three of the primary wheels 14.

Figure 8:
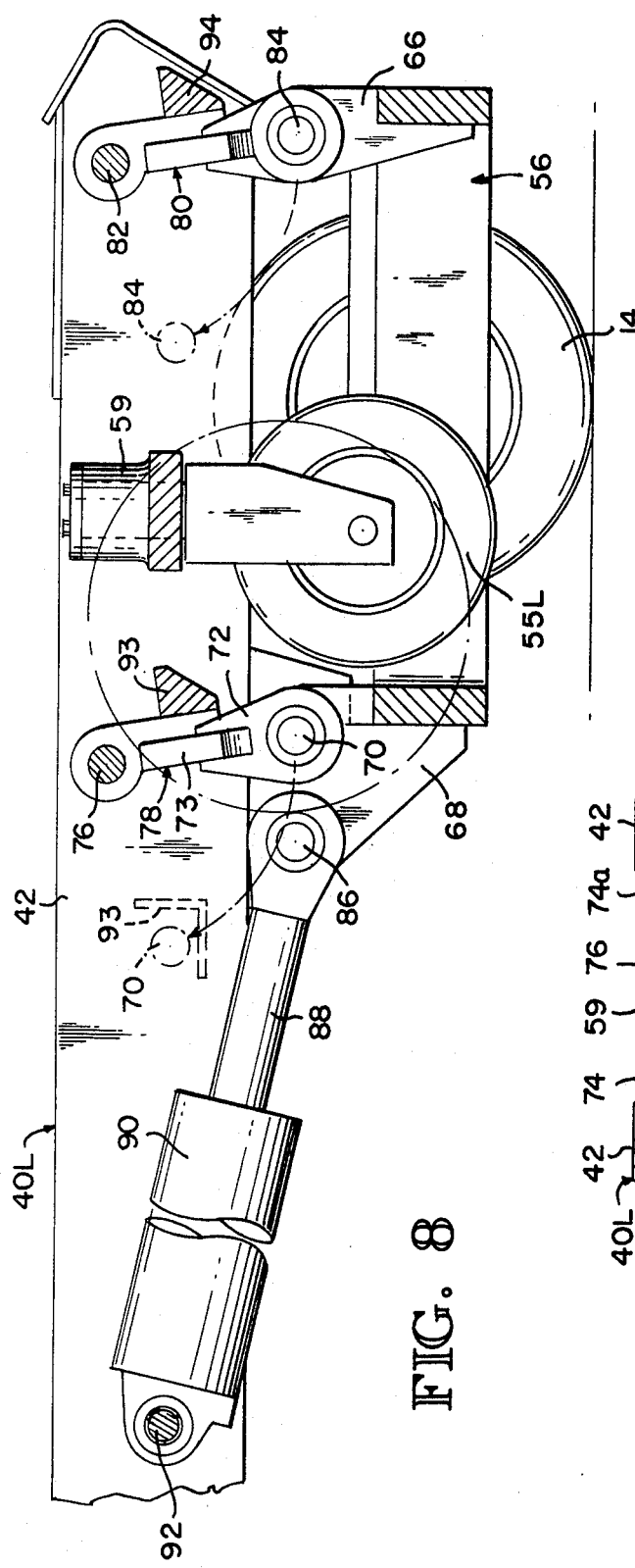
FIG. 8 is a detail longitudinal sectional view taken as indicated by line 8—8 in FIG. 7.
Figure 9:
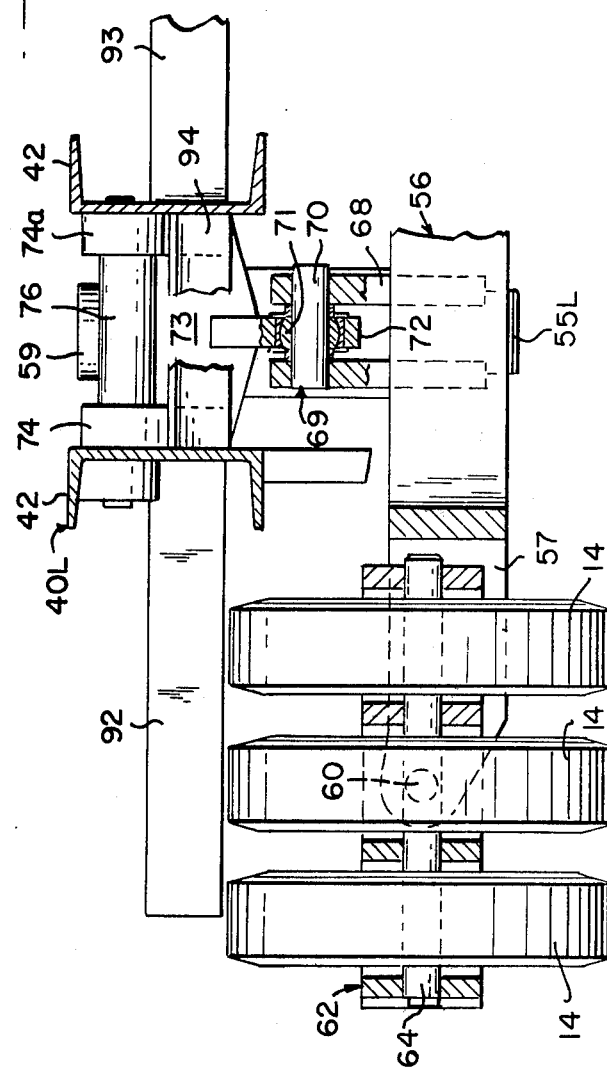
FIG. 9 is a detail transverse sectional view with parts broken away taken through the left cradle of the trailer and rearwardly of the respective caster wheel.

The cradle 56 has a pair of upwardly extending central fork arms 66 at the rear and an upwardly and forwardly extending pair of fork flanges 68 at the front. As shown in FIG. 9, the fork flanges 68 have a universal connection by way of a shaft 70 and ball joint 71 with a leg 72 depending centrally from a cross-plate 73 fixed between laterally spaced ears 74, 74a on a shaft 76 journaled between the webs of the channels 42 of the rail 40L. Collectively the leg 72, cross-plate 73, and ears 74, 74a comprise a front swing arm 78. A rear swing arm 80 of like construction to swing arm 78 is journaled at its upper end on a shaft 82 between the channels 42 of the side rail 40L at a location behind the mounting 59 for the caster wheel 55L, and has a universal connection with the fork arms 66 including a shaft 84 like that between the leg 72 and the fork flanges 68. Similarly, at their forward ends the fork flanges 68 have a like universal connection, including a shaft 86, with the rod 88 of a double-acting hydraulic cylinder 90 pivotally connected to shaft 92 extending between the channels 42 of the side rail 40L. Because of the universal joints at 86, 70 and 84, the cradle 56 is free to rock laterally with respect to the overlying side rail 40L when it occupies the lowered rear position shown in FIG. 8. In that position stop bars 93, 94 between the side rail channels 42 limit rearward swing of the parallel swing arms 78, 80. These stop bars are located such that the swing arms are a few degrees rearward of a vertical through their swing axes 76, 82 so that the weight of the trailer is transferred through the swing arms 78, 80 to the cradle 56 and bogies 62, 62a independently of the hydraulic cylinder 90 when the primary wheels 14 are in their lowered position.

From the foregoing description it will be understood that when the primary wheels 14 support the trailer the four bogies 62, 62a, 62a' and 62' with three wheels each, are free to swing independently relative to one another about axis 60–61, 60a–61a, 60'–61', and 60a'–61a', and that the left and right cradles 56, 56' can swing laterally independently of one another. Hence, the suspension system for the multiple primary wheels 14 is well adapted to accommodate changes in level from one side of the trailer to the other frequently encountered, for example, when the trailer is being towed in a turn at a ramp.

When the piston rod 88 is retracted to swing the arms 78, 80 forwardly to raise the primary wheels 14 to a level above the caster wheels 55 to the position indicated in FIG. 7, it is preferred to then prevent lateral swinging of the cradle 56 and related bogie frames 62, 62a. For this purpose stop arms 92, 93 are provided which project outwardly and inwardly, respectively, to be engaged from beneath by the upper front portion of the cradle and bogie frames when they are in their forward raised position.

Valve control for the expansion and retraction of the double-acting cylinders 90, 90' are preferably provided in the cab of the tractor, and the pressure source for the hydraulic fluid will also normally be located on the tractor. Quick disconnect fittings are provided adjacent the fifth wheel for the hydraulic lines in the tractor and trailer.

Figure 13:
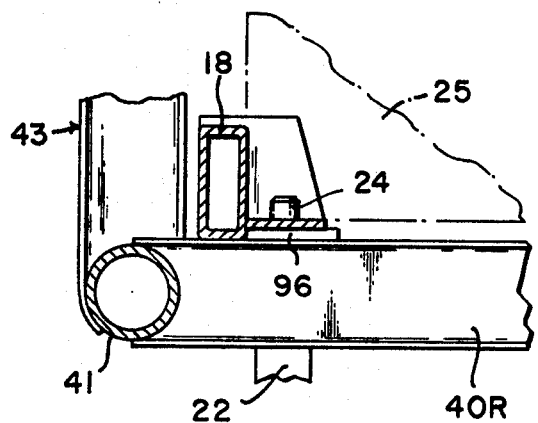
FIG. 13 is a detail longitudinal sectional view of a forward portion of the trailer and pallet frame when the latter is carried by the trailer.

When the pallet frame 10 is being transported in the trailer it is beneficial to have the forward end of the trailer elevated by the lift on the tractor at the fifth wheel to a level giving a rearward slope of the trailer frame so that the road clearance for the front legs 22 of the pallet frame will be increased for travel over the ends of a ramp. Hence, there is need to prevent rearward sliding of the pallet frame relative to the trailer. As shown in FIG. 13, this may be accomplished by providing stop pads 96 near the forward ends of the side rails 40R, 40L to be engaged by the back edge of the pallet frame. The gooseneck 43 prevents undue forward travel of the pallet frame relative to the trailer.

Figure 2:
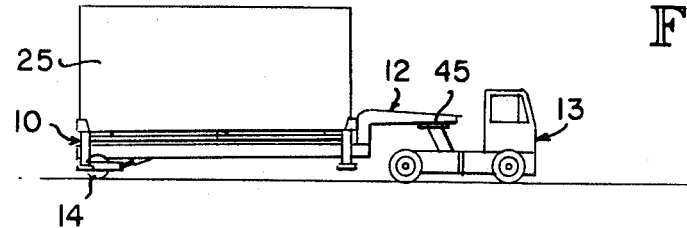
FIG. 2 shows the trailer supported on its primary wheels and carrying the pallet frame after having been backed therebeneath.
Figure 4:
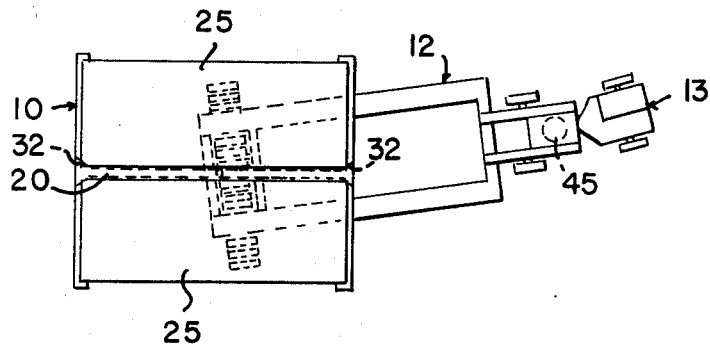
FIG. 4 shows the trailer backed part way beneath the pallet frame.

Operation of the system will now be summarized. Directing attention to FIGS. 1-4, an articulated tractor 13 with an elevatable fifth wheel 45 is shown coupled to the trailer 12. In preparation for backing beneath the pallet frame 10 the primary wheels 14 are swung upwardly so that the rear of the trailer is lowered and fully supported by the caster wheels 16, and the front of the trailer is correspondingly lowered by lowering the fifth wheel plate 45 by the lifting mechanism (not shown) on the tractor 13. The trailer is then as depicted in FIG. 1. As backing of the trailer commences the tractor and trailer can be considerably out of alinement with the pallet frame 10, and still, as shown in FIG. 3, the trailer can be maneuvered to head the guide post 52 toward the forward end of the center guide track 20 of the container loaded pallet frame 10. This is made much easier because the caster wheels 16 are then supporting the rear of the trailer. When the guide post 52 enters the guide slot of the guide rail 20 proper alinement of the rear of the trailer with the pallet frame is therafter assured as backing continues (FIG. 4). Hence, completion of the backing operation is made relatively simple. When backing has been completed the primary wheels 14 are again swung down rearwardly into load carrying position and the fifth wheel is raised whereupon the pallet frame 10 with its containers is completely supported by the trailer as shown in FIG. 2 and is ready for transport on the trailer to another site. Upon arrival there, the loaded pallet frame is easily lowered to bring its legs into ground contact by again swinging the primary wheels upwardly and by lowering the fifth wheel. The trailer can then be driven away for another load. The containers can be lifted from the pallet frame from either side thereof by a fork lift truck or the like. As previously indicated, if access to one side of the pallet frame by the fork lift truck is not possible at the site of the pallet frame, the lifting forks can reach across the center guide track 21 beneath the container on the other side thereof. In this regard, it will be noted by directing attention to the phantom line in FIG. 11 between the upper level of the plates 28, 28', that adequate clearance is provided between the upper surface of the guide track 21 and the bottom face of a container supported by the pallet frame for passage of lifting forks.

While the preferred embodiments of the invention have been illustrated and described, it should be apparent that variations will be apparent to one skilled in the art without departing from the principles herein. Accordingly, the invention is not to be limited to the specific embodiment shown in the drawing.

The embodiments of the invention in which a particular property or privilege is claimed are defined as follows:

1. A trailer for use in a container transport system of the type having load carrying pallet frames mounted on legs to be loaded on the trailer by backing the trailer beneath a selected pallet frame and elevating the trailer to lift the pallet frame with its load out of ground contact for transport on the trailer, said trailer comprising, a pallet support frame, coupling means on the front of the pallet support frame for connecting it to a towing vehicle, primary wheel means and caster wheel means mounted on said pallet support frame near the rear thereof, and level changing means connected to said pallet support frame for selectively raising and lowering the primary wheel means relative to the caster wheel means and pallet support frame to responsively move the rear of the pallet support frame between a lowered position for passage beneath a pallet frame whereat only the caster wheel means supports the rear of the pallet support frame, and a raised position for lifting the pallet frame whereat only the primary wheel means supports the rear of the pallet support frame.

2. The trailer according the claim 1 in which said coupling means comprises a gooseneck extending upwardly from the forward end of said pallet support frame and projecting forwardly, and a king pin depending from the forward end of the gooseneck.

3. A trailer according to claim 1 in which upwardly exposed pallet stop means is mounted on said pallet support frame to limit rearward movement of a pallet frame being transported on the trailer.

4. A trailer according to claim 1 in which said pallet support frame comprises a laterally spaced pair of longitudinal coplanar side rails and cross-brace means extending between said side rails near the rear ends thereof and located below the upper surface of the side rails, and central guide pivot means projecting upwardly from said cross-brace means.

5. A trailer according to claim 4 in which said coupling means comprises a gooseneck extending upwardly and projecting forwardly with respect to said side rails, and a king pin depending from the forward end of the gooseneck, and in which upwardly exposed pallet stop means are mounted on said pallet frame to limit endwise movement relative to said side rails of a pallet frame being transported on the trailer.

6. A trailer for use in a container transport system of the type having load carrying pallet frames mounted on legs to be loaded on the trailer by backing the trailer beneath a selected pallet frame and elevating the trailer to lift the pallet frame with its load out of ground contact for transport on the trailer, said trailer comprising, a pallet support frame, coupling means on the front of the pallet support frame for connecting it to a towing vehicle, primary wheel means and caster wheel means mounted on said pallet support frame near the rear thereof, and level changing means connected to said pallet support frame for selectively raising and lowering the primary wheel means relative to the caster wheel means and pallet support frame to responsively move the rear of the pallet support frame between a lowered position for passage beneath a pallet frame whereat only the caster wheel means supports the rear of the pallet support frame, and a raised position for lifting the pallet frame whereat only the primary wheel means supports the rear of the pallet support frame, said level changing means comprising a laterally spaced pair of cradle means each carrying a respective set of primary wheels and swing-mounted on said pallet support frame for limited for and aft movement between a rear lowered position and a forward raised position.

7. A trailer according to claim 6 in which said caster wheel means comprises a pair of laterally spaced caster wheels depending from said pallet support frame through respective of said pair of cradle means.

8. A trailer according to claim 6 in which the swing-mounting for each cradle means comprises a respective pair of parallel links spaced apart longitudinally of the trailer and pivotally connected at their upper ends to the pallet support frame, the lower ends of said links having a universal connection with the respective cradle means near the center thereof whereby the carriage means can swing on the links laterally of the trailer when in its lowered position and can swing with the links longitudinally of the trailer between said lowered and raised positions.

9. A trailer according to claim 6 in which swing stop means is provided on the pallet support frame for engagement by the cradle means when in forward raised position to prevent lateral swinging of the cradle means while in such position.

10. A trailer according to claim 6 in which each of said cradle means has a respective laterally spaced pair of bogie frames swing-mounted thereon to swing laterally of the trailer, said bogie frames each having a respective group of primary wheels journal-mounted thereon.

11. A trailer according to claim 10 in which said caster wheel means comprises a pair of laterally spaced caster wheels depending from said pallet support frame between the bogie frames of respective of said cradle means.

12. A trailer according to claim 6 in which said level changing means includes extensible hydraulic cylinder means extending forwardly from the forward end of said cradle means to the pallet support frame for selectively holding said carriage means in forward raised position when said hydraulic cylinder means is retracted, and means for transferring the trailer load directly to the cradle means without loading said hydraulic cylinder means when the cradle means are in said rear lowered position.

13. A trailer according to claim 12 in which swing stop means is provided to prevent lateral swinging of the cradle means when in forward raised position, and said caster wheel means comprises a pair of laterally spaced caster wheels depending from said pallet support frame through respective of said pair of cradle means.

* * * * *